Patented Dec. 11, 1951

2,577,768

UNITED STATES PATENT OFFICE 2,577,768

OXIDATION OF CUMENE

George G. Joris, Convent, N. J., assignor to Allied Chemical & Dye Corporation, New York, N. Y., a corporation of New York No Drawing. Application July 19, 1949,
Serial No. 105,648

3 Claims. (Cl. 260—610)

This invention relates to liquid phase oxidation of cumene by elemental oxygen, particularly oxygen of air, to produce cumene hydroperoxide as major product.

Air oxidations of different cumene samples in liquid phase are capable of forming under identical experimental conditions varying proportions of dimethyl phenyl carbinol, acetophenone, acids, degradation products, etc. as well as cumene hydroperoxide. Moreover samples of commercial cumene give widely discordant results in terms of conversion rates and yields for air oxidation of cumene to cumene hydroperoxide. This discordance is indicative of presence in commercial cumene (initially and/or after oxidation of the cumene) of traces of impurities having inhibitory and/or decomposition accelerator activity toward cumene hydroperoxide.

It is a principal object of this invention to provide a specific additive which when present during air oxidation of cumene greatly diminishes the irregularities normally observed, and endows all cumene samples with high oxidizability to cumene hydroperoxide. Other objects and advantages will appear hereinafter.

In accordance with my invention, I provide and maintain solid sodium bicarbonate in contact with cumene which is being oxidized in liquid phase by air (or by elemental oxygen in other form), and recover cumene hydroperoxide as major product. The sodium bicarbonate is, for example, in finely divided form, maintained in suspension in the reaction mixture by agitation thereof.

The minimum quantities of sodium bicarbonate necessary to overcome the influence of the inhibitor and decomposition accelerator impurities (initially present and/or appearing as reaction by-products in cumene samples undergoing oxidation) are rather small, typically about 0.5 gram of suspended sodium bicarbonate per 100 cc. of cumene; but larger quantities may be used, and I have found that solid sodium bicarbonate in excess of minimum quantities exerts accelerating effect on overall rate of cumene hydroperoxide formation (without substantially affecting ultimate yields). In accordance with a further feature of my invention, therefore, I add sodium bicarbonate as heterogeneous surface catalyst to cumene undergoing oxidation by air or elemental oxygen in other form with formation of cumene hydroperoxide as major product. Thus when a suspension of finely divided sodium bicarbonate is employed, preferred amounts are about 5–25 grams of sodium bicarbonate per 100 cc. of cumene.

In oxidizing cumene in presence of solid sodium bicarbonate as additive, reaction temperatures between about 60° C. and about 90° C. should be used.

The activity of sodium bicarbonate in overcoming adverse effects of impurities is not fully understood. Other materials of alkaline reaction do not necessarily impart high oxidizability of cumene samples to cumene hydroperoxide; and so far as I am aware, there is no other material which is the equal of sodium bicarbonate in endowing cumene with high oxidizability to cumene hydroperoxide in the temperature range 60° to 90° C.

The following examples illustrate my invention, but are not intended in a limiting sense.

*Example 1 (a).*—A 300 cc. sample of commercial cumene was used without any pretreatment and 3.3 grams of 200 mesh reagent grade sodium bicarbonate were added per 100 cc. of cumene. The temperature of oxidation was 75° C.; air was flowed at a rate of 5 liters per hour. The increase in concentration of hydroperoxide with time and the corresponding overall mol percent yields are given in the table below.

*(b).*—A 300 cc. sample of commercial cumene from the same manufacturer was oxidized under conditions similar to Example 1 (a) except that sodium bicarbonate was absent during the oxidation. The results are given in the following table.

| Time, in Hours | With NaHCO$_3$ | | Without NaHCO$_3$ | |
|---|---|---|---|---|
| | Per cent CHP [1] | Mol per cent yield [2] | Per cent CHP [1] | Mol per cent yield [2] |
| 18 | 0.63 | | 0.075 | |
| 32 | 5.5 | | 0.28 | |
| 56 | 14.5 | | 1.25 | |
| 105 | 26.1 | 92 | 7.0 | |
| 129 | 35.7 | 90.5 | 10.0 | 87 |
| 154 | 44.4 | 90 | 12.5 | |
| 176 | 51.7 | 90 | | |
| 200 | 57.6 | 89.5 | 14.0 | |
| 240 | | | 16.0 | |
| 260 | | | 14.0 | |
| 281 | | | 0.75 | 10 |

[1] Weight per cent cumene hydroperoxide present in reaction mixture.
[2] Mol per cent yield of cumene hydroperoxide on unrecovered cumene.

*Example 2.*—A sample of commercial cumene was shaken with aqueous sodium hydroxide; and then separated; a batch of 0.3 liter of this cumene was passed into a glass reactor. 22.5 grams of 200 mesh reagent grade sodium bicarbonate per 100 cc. of entering cumene was maintained in suspension in the reaction mixture by mechanical stirring. Air was flowed at a rate of 5 liters per hour into the reaction mixture. With the temperature maintained at about 75° C. the overall average rate of oxidation of cumene to cumene hydroperoxide was 0.37 weight percent; i. e. 0.37 gram of cumene hydroperoxide was formed per 100 grams of reaction mixture per hour. The overall yield of cumene hydroperoxide was 94% of theory based on cumene unrecovered; the oxidation lasted 72 hours until the concentration of cumene hydroperoxide reached 26.5 weight percent of the reaction mixture.

Using a temperature of 90° C. under conditions otherwise identical, the overall rate of oxidation was 1.46 weight percent of cumene hydroperoxide formed per hour; the yield of cumene hydroperoxide was 92% of theory based on unrecovered cumene at 27 weight percent of hydroperoxide; and a concentration of cumene hydroperoxide of 43 weight percent was reached after 29 hours.

*Example 3 (a)*.—A sample of commercial cumene which had been carefully redistilled was oxidized at 75° C. in the presence of one gram of 200 mesh reagent grade sodium bicarbonate per 100 cc. of cumene. Oxygen was flowed at a rate of 5 liters per hour into the reaction mixture. After an induction period which lasted about 160 hours the rate of formation of hydroperoxide increased gradually and at the end of 258 hours, the cumene hydroperoxide reached a concentration of 37 weight percent in the oxidation products. The yield of cumene hydroperoxide was 92.8% of theory based on cumene unrecovered.

*(b)*.—Cumene pretreated as in Example 2 was oxidized with elemental oxygen introduced at a rate of 5 liters per hour with stirring as in Example 2. The following table shows the effect of excess sodium bicarbonate (200 mesh, reagent grade).

| Grams Sodium Bicarbonate/100 cc. of cumene | Temperature, °C. | Overall rate of Oxidation [1] | Yield [2] | Total cumene hydroperoxide formed (weight per cent) |
|---|---|---|---|---|
| 15 | 75 | 0.22 | 94 | 30 |
| 22.5 | 75 | 0.37 | 93 | 27 |

[1] (Weight per cent of cumene hydroperoxide in reaction mixture)÷duration of run in hours.
[2] Per cent of theory based on unrecovered cumene.

In the preceding examples reagent grade sodium bicarbonate was used to minimize possible irregularities due to impurities. It is not necessary to use reagent grades of sodium bicarbonate to obtain the benefits of this invention, however. Commercial grades of sodium bicarbonate sold as baking soda give excellent results.

In the preceding examples cumene to be oxidized was pretreated by shaking with aqueous sodium hydroxide. As disclosed and claimed in my copending application Serial No. 105,647 filed simultaneously herewith, I have found that treatment of cumene with aqueous sodium hydroxide eliminates or at least greatly reduces the initial induction period, which with some cumene samples amounts to many hours during which although reaction condtions have been established, no appreciable reaction occurs.

In the examples the sodium bicarbonate is in finely divided form and is suspended in the reaction mixture; but it is also possible to operate otherwise, for example by passing cumene and air into a heated tower packed with sodium bicarbonate pellets.

Solid sodium bicarbonate employed as in the above examples slowly becomes coated with a brown solid and begins to lose its effectiveness. The coating can be removed by washing first with acetone, then with water. The pure white sodium bicarbonate, thus obtained, after drying shows its original effectiveness in the above oxidation process. Alternatively the solid sodium bicarbonate may be regenerated by dissolution in hot water, separation of organic layer, crystallization and drying.

The cumene hydroperoxide product of my process may be recovered as its solution in the reaction mixture; or if desired, it may be recovered in more concentrated form by stripping out cumene and other impurities from the heated reaction mixture with air.

Among suitable materials for construction or lining of apparatus employed in my process are stainless steel, aluminum, magnesium, and glass. Each has satisfactory corrosion resistance to my reaction mixtures and is satisfactorily free of undesirable influence on the oxidation reaction.

Temperatures which should be maintained during oxidation of cumene in presence of sodium bicarbonate are between about 65° C. and about 90° C. Lower temperatures result in undesirably slow reaction and higher temperatures lower the yields of cumene hydroperoxide based on unrecovered cumene. Pressures are suitably about atmospheric. Air flows, rate of stirring, dispersion of air, and the like have a joint secondary influence on reaction rates and yields and should therefore be interadjusted for optimum results.

I claim:

1. In a process for oxidizing cumene to cumene hydroperoxide in liquid phase with elemental oxygen as oxidizing agent, the improvement which comprises maintaining solid sodium bicarbonate in contact with said cumene, at reaction temperature in the range between about 60° C. and about 90° C.

2. Process as defined in claim 1 wherein air is the oxidizing agent and finely divided sodium bicarbonate in amounts between about 5 grams and about 25 grams per 100 cc. of entering cumene is suspended in the reaction mixture.

3. Process as defined in claim 1 wherein sodium bicarbonate employed in cumene oxidation is periodically regenerated by washing first with acetone and then with water.

GEORGE G. JORIS.

REFERENCES CITED

The following references are of record in the file of this patent:

UNITED STATES PATENTS

| Number | Name | Date |
|---|---|---|
| 2,447,794 | Brewer | Aug. 24, 1948 |

FOREIGN PATENTS

| Number | Country | Date |
|---|---|---|
| 610,293 | Great Britain | Oct. 13, 1948 |